(12) United States Patent
Van Berkel

(10) Patent No.: US 8,259,241 B2
(45) Date of Patent: Sep. 4, 2012

(54) AUTOSTEREOSCOPIC DISPLAY APPARATUS AND FILTER THEREFOR

(75) Inventor: Cornelis Van Berkel, Hove (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 1139 days.

(21) Appl. No.: 12/066,682

(22) PCT Filed: Sep. 11, 2006

(86) PCT No.: PCT/IB2006/053206
§ 371 (c)(1),
(2), (4) Date: Mar. 13, 2008

(87) PCT Pub. No.: WO2007/031931
PCT Pub. Date: Mar. 22, 2007

(65) Prior Publication Data
US 2008/0218855 A1     Sep. 11, 2008

(30) Foreign Application Priority Data
Sep. 16, 2005  (EP) ..................................... 05108562

(51) Int. Cl.
*G02F 1/1335* (2006.01)
*G02F 1/1343* (2006.01)

(52) U.S. Cl. ......................................... 349/15; 349/146

(58) Field of Classification Search .................... 349/15, 349/146
See application file for complete search history.

(56) References Cited

U.S. PATENT DOCUMENTS

| | | | |
|---|---|---|---|
| 5,833,507 A | 11/1998 | Woodgate et al. | |
| 5,850,269 A * | 12/1998 | Kim ................................ | 349/15 |
| 5,953,148 A * | 9/1999 | Moseley et al. ................ | 359/237 |
| 6,064,424 A * | 5/2000 | van Berkel et al. ............. | 348/51 |
| 6,118,584 A * | 9/2000 | Van Berkel et al. ............ | 359/463 |
| 7,787,008 B2 * | 8/2010 | Fukushima et al. ............. | 348/51 |
| 2003/0011884 A1 | 1/2003 | Van Berkel | |
| 2005/0036221 A1 | 2/2005 | Cheng et al. | |

FOREIGN PATENT DOCUMENTS

| | | |
|---|---|---|
| EP | 0625861 A2 | 11/1994 |
| EP | 0791847 A1 | 8/1997 |
| EP | 0833184 A1 | 4/1998 |
| EP | 1729164 A1 | 12/2006 |
| GB | 2196166 A | 4/1988 |
| GB | 2320156 A | 6/1998 |
| WO | 9702709 A2 | 1/1997 |
| WO | 2005006777 A2 | 1/2005 |
| WO | 2005093494 A1 | 10/2005 |

OTHER PUBLICATIONS

Cees Van Berkel, Image Preparation for 3D-LCD, Proc. SPIE, vol. 3639, Jan. 1999 pp. 84-91.

* cited by examiner

*Primary Examiner* — Dung T. Nguyen
(74) *Attorney, Agent, or Firm* — Larry Liberchuk

(57) ABSTRACT

An autostereoscopic display apparatus (8), comprising: a plurality of individually addressable display elements (2) arranged in an array of rows and columns; and light directing means (15) comprising a plurality of light directing elements (16) at a slant angle (α) to the column direction (6); wherein the shape of the individually addressable display elements (2) substantially comprises the shape remaining from a rectangular footprint when one or more cut-outs (2c) is removed; the one or more cut-outs (2c) being positioned relative to the slanted angle (α) of the light directing elements (16) such as to provide a reduction in brightness variation along the row direction (4) compared to what individually addressable display elements shaped according to the rectangular footprint would provide.

17 Claims, 8 Drawing Sheets

AUTOSTEREOSCOPIC DISPLAY APPARATUS AND FILTER THEREFOR

The present invention relates to autostereoscopic display apparatus, including, but not limited to, colour autostereoscopic display apparatus and autostereoscopic display apparatus switchable between an autostereoscopic display mode and a two-dimensional (2-D) display mode.

Stereoscopic displays provide an image that is made up of different sub-images at different viewing points. If suitably adjusted different sub-images (i.e. with appropriate binocular disparity) are provided to the left eye and the right eye of a viewer, the overall image is perceived by the viewer as a three dimensional image. One known method to provide differing images is by varying the colour content, with the viewer needing to wear special spectacles with a different colour-absorbing lens in each eyepiece.

Stereoscopic displays that provide an image made up of different sub-images at different viewing points without the viewer needing to wear special spectacles are known as autostereoscopic displays. A typical autostereoscopic display comprises a matrix liquid crystal display (LCD) panel comprising an array of display elements arranged in rows and columns. The display further comprises means for directing output light from the array of display elements such that the visual output provided from a given point on the display panel is dependent upon the viewing angle. This means that the right eye of a viewer will see a different view to that seen by the left eye, providing the desired stereoscopic or three-dimensional image.

A well known form of the output light directing means is a lenticular sheet overlying the display panel. A lenticular sheet, for example in the form of a moulded or machined sheet of polymer material, overlies the output side of the display panel with its lenticular elements, comprising (semi) cylindrical lens elements, extending in the column direction with each lenticular element being associated with a respective group of two, or more, adjacent columns of display elements and extending parallel with the display element columns. In an arrangement in which each lenticule is associated with two columns of display elements, the display panel is driven to display a composite image comprising two 2-D sub-images vertically interleaved, with alternate columns of display elements displaying the two images, and the display elements in each column providing a vertical slice of the respective 2-D sub-image. The lenticular sheet directs these two slices, and corresponding slices from the display element columns associated with the other lenticules, to the left and right eyes respectively of a viewer in front of the sheet so that, with the sub-images having appropriate binocular disparity, the viewer perceives a single stereoscopic image. In other, so-called multi-view, arrangements, in which each lenticule is associated with a group of more than two adjacent display elements in the row direction and corresponding columns of display elements in each group are arranged appropriately to provide a vertical slice from a respective 2-D (sub-) image, then as a viewer's head moves a series of successive, different, stereoscopic views are perceived for creating, for example, a greater degree of viewing freedom and/or a look-around impression.

Autostereoscopic display apparatus of this kind can be used for various applications, for example in medical imaging, virtual reality, games, mobile telephone and CAD fields.

Autostereoscopic display apparatus switchable between 2-D and autostereoscopic operation are known. This is provided, for example, by provision of a diffusion layer switchable between diffusing and non-diffusing, such that the diffusing state cancels out the light directional effect of the lenticular lens, thus reducing the autostereoscopic view to a 2-D view.

Typically, in autostereoscopic mode, spatial resolution is lost due to the provision of separate individually addressable display elements of a given colour for different views along the row direction in a given pixel. Also, brightness variations occur across the display, i.e. in the row direction, in autostereoscopic mode.

The effect of the spatial resolution loss in an autostereoscopic display, as discussed above, has been alleviated by the use of slanted orientation of the lenticular lens relative to the column direction of the pixels, as disclosed for example in EP-A-0 791 847. Broadly speaking, such an arrangement tends to "share" the loss of resolution between row and column direction, thus reducing the starkness of the resolution in the row direction, especially for larger numbers of view multi-view displays. The use of slanted orientation of the lenticular lens relative to the column direction of the pixels also reduces brightness variations in the row direction; however this does not eliminate the brightness variations. Further details of the use of slanted orientation of the lenticular lens are discussed in the article "Image preparation for 3D-LCD", Cees van Berkel, proc SPIE, vol. 3639, pages 84-91, 1999.

FIG. 1 is a schematic illustration (not to scale) showing a typical conventional shape and layout of individually addressable display elements 2 of respective colours red, blue and green (indicated as R, G or B respectively) in a conventional colour filter 1, arranged in a row direction 4 and column direction 6. Each individually addressable display element 2 is approximately rectangular in shape.

Various prior art references disclose autostereoscopic display devices in which the individually addressable display elements 2 are shaped other than rectangular, as is the case, for example, in the following references. U.S. Pat. No. 5,833,507 discloses pixels shaped and arranged such that groups of two or more columns of pixel openings (i.e. the spaces between the pixels) are defined such that the columns of each group are substantially contiguous. WO 2005/006777 A discloses a pixel shape whose vertical height is flat in a central portion and increases towards the edges. EP-A-0 833 184 discloses an autostereoscopic display in which pixels overlap horizontally so that there are overlapping regions and non-overlapping regions. WO 97/02709 discloses an autostereoscopic display shaped as non-rectangular parallelograms, or triangles, successive ones being inverted, or interdigitated, or arranged in two or more rows. US 2005/0036221 A discloses octagonal colour elements of a colour filter disposed in a delta-type arrangement without gaps between the elements.

The present inventor has realised that conventional shapes and arrangements of the individually addressable elements of autostereoscopic displays contribute to the brightness variations in the row direction, particularly brightness variations in the row direction that remain despite use of slanted orientation of the lenticular lens. The present inventor has further realised that such brightness variations may be alleviated by particular changes to conventional shapes and arrangements of the individually addressable elements of autostereoscopic displays.

In a first aspect, the present invention provides an autostereoscopic display apparatus, comprising: a plurality of individually addressable display elements arranged in an array of rows and columns; and light directing means comprising a plurality of light directing elements; the light directing elements and the column direction of the array of individually addressable display elements having a slant angle therebetween; the display providing in operation a plurality of light collection lines parallel to the longitudinal axis of the light directing elements extending over the array; wherein the shape of the individually addressable display elements substantially comprises the shape remaining from a rectangular footprint when one or more cut-outs is removed; the one or more cut-outs being positioned relative to the slanted angle of the light directing elements such that the extent by which each respective light collection line overlaps the individually addressable display elements is more equal than would be the case were the individually addressable display elements shaped according to the rectangular footprint.

In a further aspect, the present invention provides an autostereoscopic display apparatus, comprising: a plurality of individually addressable display elements arranged in an array of rows and columns; and light directing means comprising a plurality of light directing elements; the light directing elements and the column direction of the array of individually addressable display elements having a slant angle therebetween; the display providing in operation a plurality of light collection lines parallel to the longitudinal axis of the light directing elements extending over the array; wherein the shape of the individually addressable display elements substantially comprises the shape remaining from a rectangular footprint when one or more cut-outs is removed; the one or more cut-outs being positioned relative to the slanted angle of the light directing elements such that the extent by which each respective light collection line overlaps the individually addressable display elements is substantially equal for all the light collection lines.

The extent by which each respective light collection line overlaps the individually addressable display elements may vary between any two light collection lines by less than 25%, by less than 10%, or by less than 5%.

In a further aspect, the present invention provides an autostereoscopic display apparatus, comprising: a plurality of individually addressable display elements arranged in an array of rows and columns; and light directing means comprising a plurality of light directing elements; the light directing elements and the column direction of the array of individually addressable display elements having a slant angle therebetween; wherein the shape of the individually addressable display elements substantially comprises the shape remaining from a rectangular footprint when one or more cut-outs is removed; the one or more cut-outs being positioned relative to the slanted angle of the light directing elements such as to provide a reduction in brightness variation along the row direction compared to what individually addressable display elements shaped according to the rectangular footprint would provide.

In a further aspect, the present invention provides an autostereoscopic display apparatus, comprising: a plurality of individually addressable display elements arranged in an array of rows and columns; and light directing means comprising a plurality of light directing elements; the light directing elements and the column direction of the array of individually addressable display elements having a slant angle therebetween; wherein the shape of the individually addressable display elements substantially comprises the shape remaining from a rectangular footprint when one or more cut-outs is removed; the one or more cut-outs being of a height substantially equal to the mask gap size in the row direction divided by the tangent of the slant angle and of a width substantially equal to the mask gap size in the column direction multiplied by the tangent of the slant angle.

In each of the above aspects, the shape of the individually addressable display elements may substantially comprise the shape remaining from a rectangular footprint when a single substantially rectangular cut-out is removed from a corner of the rectangular footprint.

In each of the above aspects, the shape of the individually addressable display elements substantially may comprise the shape remaining from a rectangular footprint when a single substantially rectangular cut-out is removed from the centre of the rectangular footprint.

In each of the above aspects, the shape of the individually addressable display elements substantially may comprise the shape remaining from a rectangular footprint when a first cut-out is removed from a first corner of the rectangular footprint and a second cut-out is removed from a second corner of the rectangular footprint, the second corner being diagonally opposite the first corner. The first cut-out and the second cut-out may together form an effective rectangular cut-out.

In each of the above aspects, the shape of the individually addressable display elements and the spacing between the individually addressable display elements may be arranged to meet a criterion that each light collection line overlaps only one individually addressable display element on each row.

In a further aspect, the present invention provides a monochrome or colour filter for use in a display, the filter comprising a plurality of individual filter elements arranged in an array of rows and columns; wherein the shape of the individual filter elements comprises the shape remaining from a rectangular footprint when one or more cut-outs is removed; the one or more cut-outs being positioned along a diagonal direction across the rectangular footprint.

The shape of the individual filter elements may substantially comprise the shape remaining from a rectangular footprint when a single substantially rectangular cut-out is removed from a corner of the rectangular footprint.

The shape of the individual filter elements may substantially comprise the shape remaining from a rectangular footprint when a single substantially rectangular cut-out is removed from the centre of the rectangular footprint.

The shape of the individual filter elements may substantially comprise the shape remaining from a rectangular footprint when a first cut-out is removed from a first corner of the rectangular footprint and a second cut-out is removed from a second corner of the rectangular footprint, the second corner being diagonally opposite the first corner. The first cut-out and the second cut-out may together form an effective rectangular cut-out.

Embodiments of the present invention will now be described, by way of example, with reference to the accompanying drawings, in which.

Figures 10A, 10B:
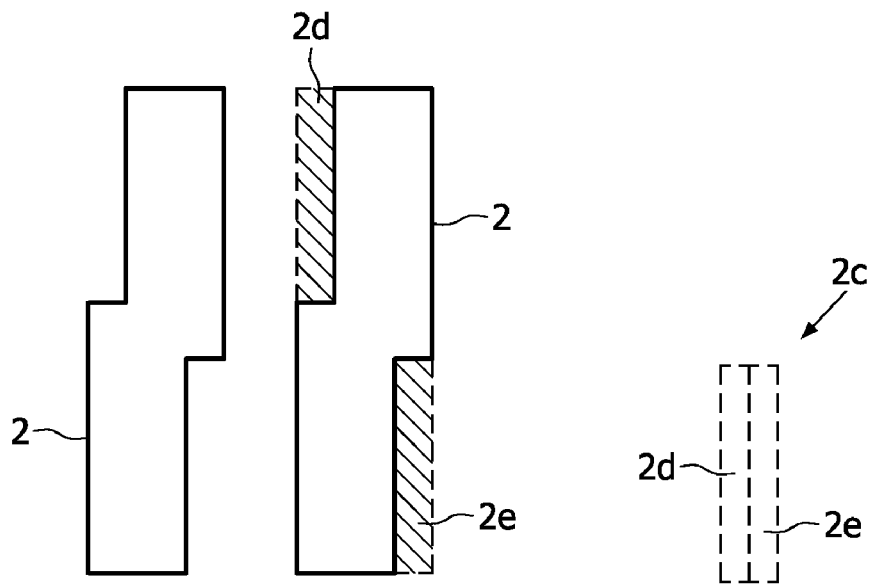
FIG. 10a is a schematic illustration (not to scale) showing two individually addressable display elements of a further embodiment.
Figures 11A, 11B:
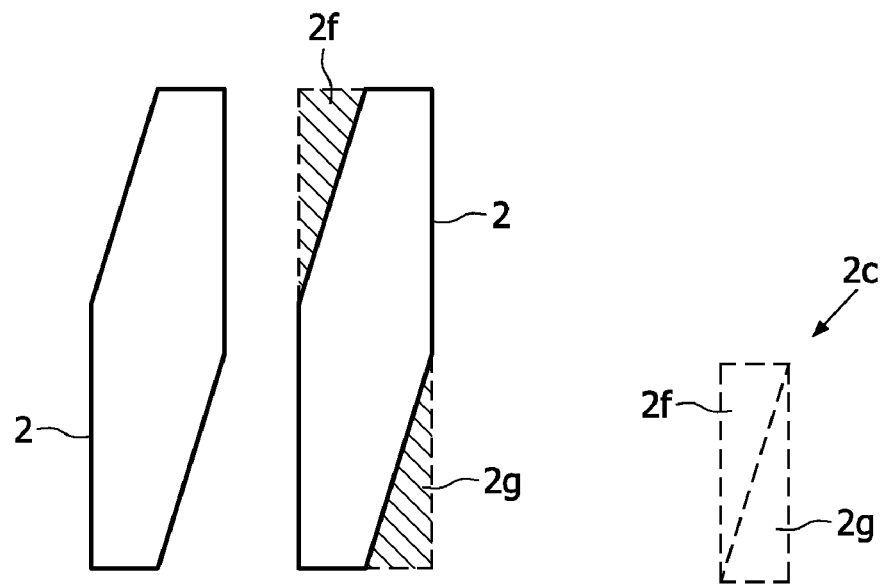

FIG. 10b indicates schematically operation of the elements of FIG. 10a;

FIG. 11a is a schematic illustration (not to scale) showing two individually addressable display elements of a further embodiment; and FIG. 11b indicates schematically operation of the elements of FIG. 11a.

Figure 1:
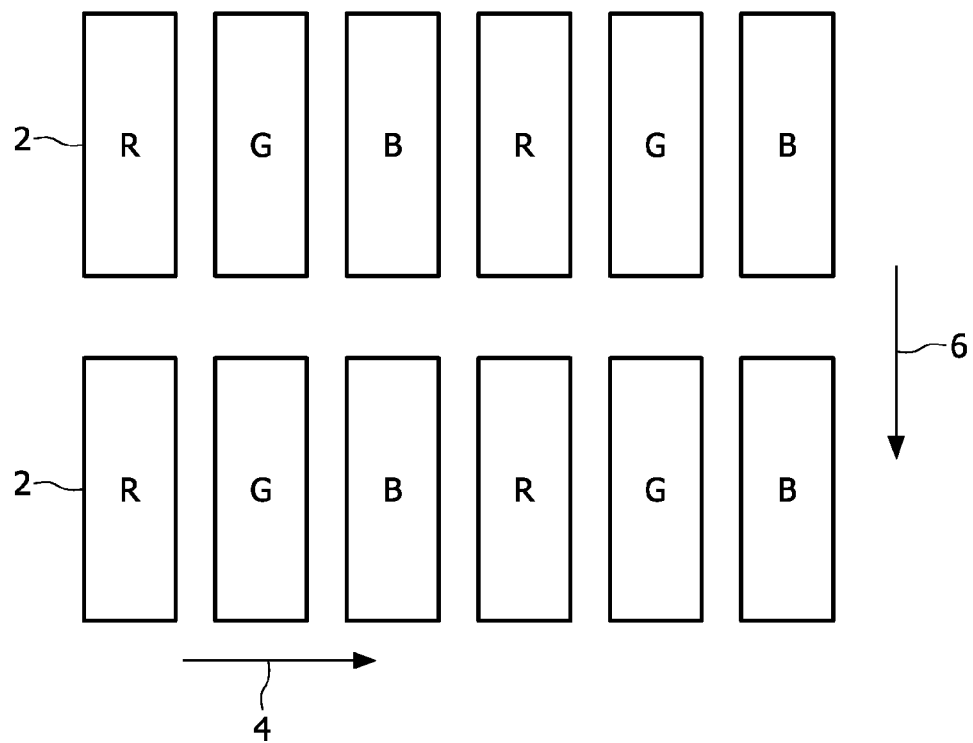
FIG. 1 is a schematic illustration (not to scale) showing a typical conventional shape and layout of individually addressable display elements.
Figure 2:
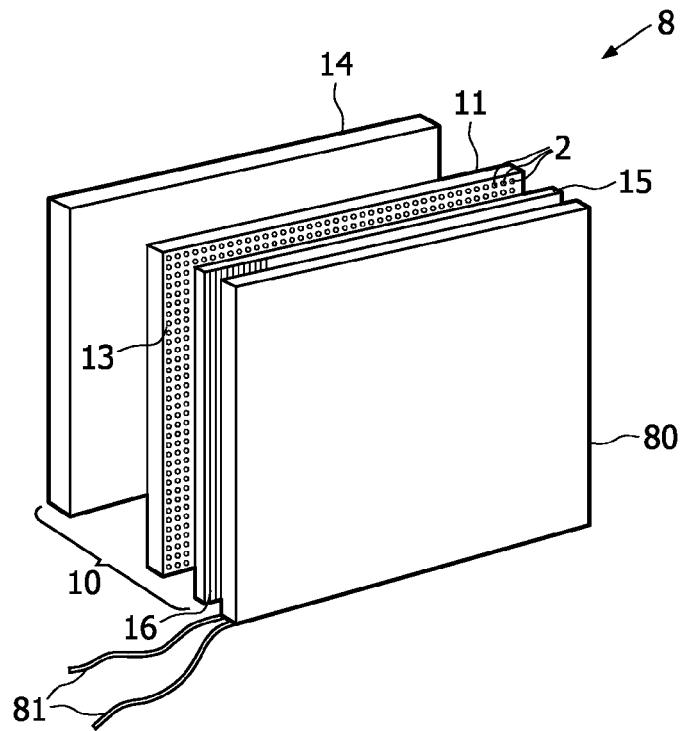
FIG. 2 is a schematic perspective view (not to scale) of a first embodiment of a switchable (between autostereoscopic operation and 2-D operation) colour display apparatus.

FIG. 2 is a schematic perspective view (not to scale) of a first embodiment of a switchable (between autostereoscopic operation and 2-D operation) colour display apparatus 8 comprising an autostereoscopic display means 10 and an electrically switchable light diffuser 80.

The autostereoscopic display 10 comprises an active colour matrix liquid crystal display (AMLCD) panel 11 used as a spatial light modulator and having a planar array of individually addressable display elements 2 arranged in aligned rows and columns perpendicular to one another, i.e. each individually addressable display element 2 in a given row (except for the first row) is directly below an individually addressable display element 2 of the row above the given row. A respective colour for each individually addressable display elements 2 is provided by a colour filter 13. The individually addressable display elements 2 are shown schematically with only a comparatively few in each row and column for simplicity. The display panel 11 is illuminated by a light source 14 which can be of any suitable kind and in this example comprises a planar back-light co-extensive with the area of the display element array. Light incident on the panel is modulated by the individually addressable display elements 2 by the application of appropriate drive voltages thereto so as to produce the desired image display output.

Overlying the output side of the display panel 11, there is disposed a lenticular sheet 15 providing an array of elongate, parallel, lenticular elements 16. The lenticular elements 16 comprise optically cylindrically converging lenticules, for example formed as convex cylindrical lenses which extend parallel to each other and, in this embodiment, at a slanted angle to the columns of individually addressable display elements 2, and serve in a known manner to provide separate images, which are generated in the array of the display panel 11 in a vertically interleaved fashion, to the two eyes of a viewer facing the side of the lenticular sheet 15 remote from the display panel 11 so that a stereoscopic, or 3-D, image can be perceived. Autostereoscopic display apparatus using lenticular sheets in conjunction with matrix display panels are well known and it is not thought necessary to describe here in detail their operation. Examples of such apparatus and their operation are described or referenced in US-A1-2003/0011884 and in GB-A-2196166, both of whose contents are incorporated herein by reference. Each lenticular element 16 may overlie a respective group of two, three, or more, adjacent columns of individually addressable display elements 2, to provide a corresponding number of views.

Each lenticular element provides a spatially discrete output beam from each of the associated pixel columns in mutually different, angular directions. The display panel is driven so that a narrow vertical slice of a 2-D (sub) image is produced by each column of sub-pixels with the display produced comprising a plurality of interleaved 2-D (sub) images which are to be seen by the left and right eye respectively of a viewer. Each lenticular element 16 thus provides a plurality of output beams, one from each of its associated columns of sub-pixels, whose optical axes are in mutually different directions and angularly spread around the longitudinal axis of the lenticular element. With appropriate 2-D image information applied to respective columns of display elements then to a viewer whose eyes receive different ones of the beams a 3-D image is perceived. With each lenticular element being associated with a plurality of several sub-pixel columns then different stereoscopic images or image pairs can be viewed as the viewer's head moves in the row direction. In other embodiments, the lenticular elements may be substantially aligned with the sub-pixel columns, however in this embodiment they are slanted with respect to the columns, as will be described in more detail below with reference to FIG. 3, and as is described in EP-A-0 791 847, whose contents are incorporated herein by reference.

Figure 3:
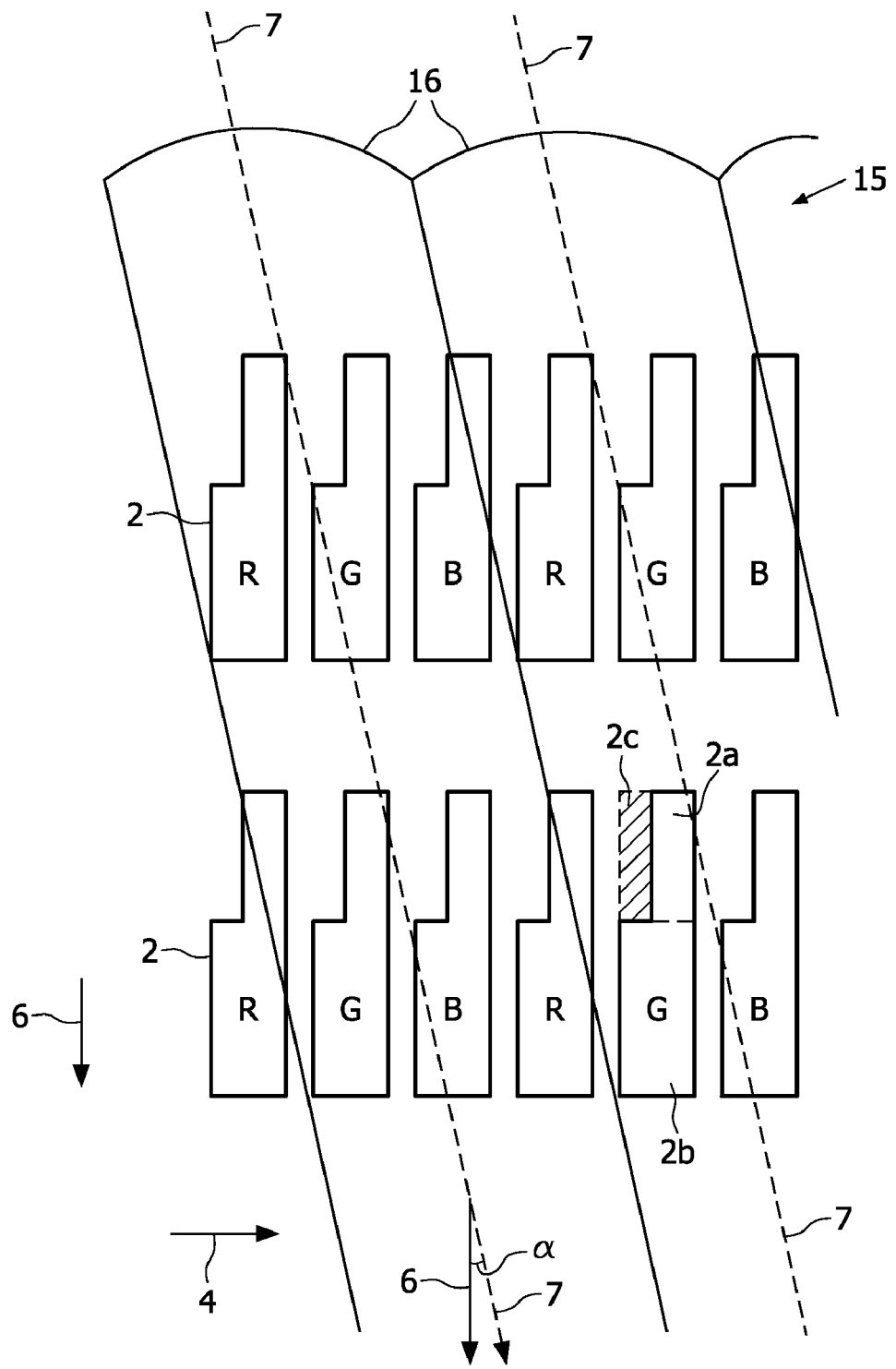
FIG. 3 is a schematic illustration (not to scale) showing further details of the colour filter 13 and lenticular sheet 15 of the colour display apparatus of FIG. 2.

FIG. 3 is a schematic illustration (not to scale) showing further details of the colour filter 13 and lenticular sheet 15 of the colour display apparatus 8. The individually addressable display elements 2 are arranged in rows and columns. For clarity, only two rows and six columns are shown, although the display comprises many more rows and columns. The colour filter 13 provides one of the colours red (indicated as R), green (indicated as G), or blue (indicated as B) to each individually addressable display element 2. Three adjacent addressable display elements 2 in a row provide a colour pixel in 2-D mode of operation.

The lenticular sheet 15 comprises longitudinal lenticular elements 16. The lenticular elements 16 are arranged slanted with respect to the columns of individually addressable display elements 2, that is, the main longitudinal axis 7 of the lenticular elements 16 is at an angle α to the column direction 6 of the array of individually addressable display elements 2.

The pitch of the lenticular elements 16 is chosen in relation to the pitch of the individually addressable display elements 2 in the row direction 4 according to the number of views required, and each lenticular element 16, apart from those at the sides of the display element array, extends from top to bottom of the display element array. Note that these dimensions and relationships are shown merely schematically and not to scale in FIG. 3. In this embodiment $\tan \alpha = \frac{1}{3}$ and the autostereoscopic display 10 is a 5-view display, that is the lenticular elements 16 are of such a width with respect to the pitch of the individually addressable display elements 2 in a row, and the slant angle α is such as to provide a 5-view arrangement. Further details relating to the number of views is given in EP-A-0 791 847, which is incorporated herein by reference.

In this embodiment, the individually addressable display elements 2 are not of substantially rectangular shape. Instead, the individually addressable display elements are of a shape comprising (with the terminology "right" and "left" referring to as viewed in the example of FIG. 3, and with the terminology "above" referring to higher up the page as viewed in the example of FIG. 3) a first rectangle 2a positioned above a second rectangle 2b, the first rectangle 2a being of lesser width than the second rectangle 2b, and the first rectangle 2a being positioned at the right hand side of the second rectangle 2b such that the right hand side of the first rectangle 2a and the right hand side of the second rectangle 2b form a continuous substantially straight right hand side of the individually addressable display element 2. Another description of the shape of the individually addressable display elements 2 is that they are of substantially or approximately rectangular shape except for a substantially or approximately rectangular portion 2c, hereinafter referred to as a cut-out region 2c, has been removed from the top left hand corner. Further details of this shape are described below. This shape, in combination with the spacing between the individually addressable display elements tends to provide a reduction in brightness variation along the row direction 4, as will be described in more detail below.

Figure 4A:
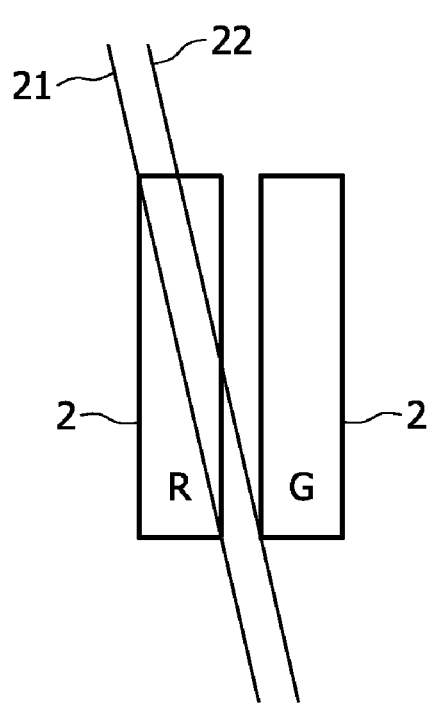
FIG. 4a is a schematic illustration (not to scale) showing two conventional rectangular shaped individually addressable display elements.

The effect of the shape of the individually addressable display element 2 of this embodiment can best be understood by first considering an aspect of the operation of prior art individually addressable display elements 2 that has been realised by the present inventor and is as shown in FIG. 4a. FIG. 4a is a schematic illustration (not to scale) showing two conventional rectangular shaped individually addressable display elements 2. The conventional rectangular shaped individually addressable display elements 2 are located at the focal plane of the lenticular elements 16 of the lenticular sheet 15 (as described above with reference to FIG. 3, but for clarity not shown in FIG. 4a). Hence, the operation of the lenticular element 16 can best be understood by considering the way that it collects light along a continuous plurality of light collection lines for emission into a certain direction, e.g. a direction corresponding to the remote location of a viewer's eye. Each light collection line is parallel with the longitudinal axis 7 of the lenticular elements 16, i.e. each light collection line is at an angle α to the column direction 6 of the array of individually addressable display elements 2. Let us consider, by way of example, a first light collection line, indicated in FIG. 4a by reference numeral 21. The lenticular element 16 effectively collects light along the entire portion of the first light collection line 21 where it superimposes on the individually addressable display elements 2 over all the rows of the array, although for convenience only one row is shown in FIG. 4a. Let us now also consider a second light collection line, indicated in FIG. 4a by reference numeral 22. As can be seen from FIG. 4a, the amount by which the second light collection line 22 overlaps the individually addressable display element 2 is less than the amount by which the first light collection line 21 overlaps the individually addressable display element 2. In other words, the amount of light collected by the lenticular element 16 in the case of the second light collection line 22, i.e. corresponding to a second direction, is less than the amount of light collected by the lenticular element 16 in the case of the first light collection line 21, i.e. corresponding to a first direction. Hence in autostereoscopic mode the display 10 appears darker in the portion of the display viewed under the second direction corresponding to second light collection line 22 than in a portion of the display 10 viewed under a first direction corresponding to first light collection line 21. This manifests itself as a variation in brightness in the row direction 4.

Figure 4B:
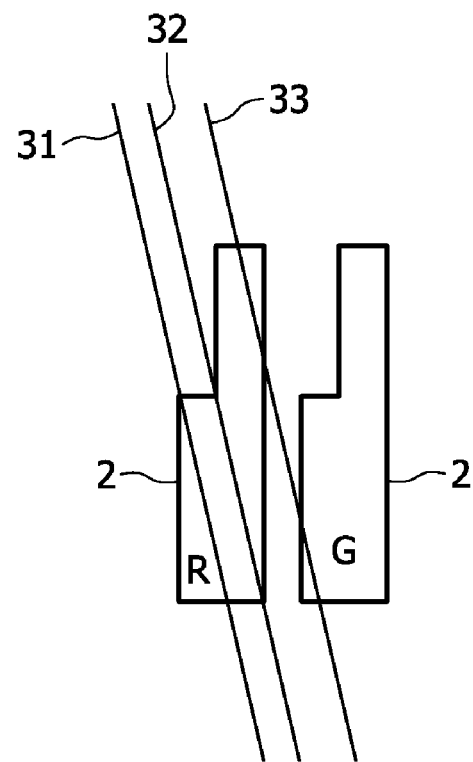
FIG. 4b is a schematic illustration (not to scale) showing two individually addressable display elements 2 shaped to reduce brightness variation.

FIG. 4b is a schematic illustration (not to scale) showing two individually addressable display elements 2 shaped, as described above with reference to FIG. 3, to reduce the brightness variation. As with the conventional arrangement of FIG. 4a, the individually addressable display elements 2 are located approximately at the focal plane of the lenticular elements 16 of the lenticular sheet 15 (as described above with reference to FIG. 3, but for clarity not shown in FIG. 4b). As with the above analysis of the prior art operation, let us consider a plurality of light collection lines, indicated in FIG. 4b by reference numerals 31-33, parallel with the main longitudinal axis 7 of the lenticular elements 16. The lenticular element 16 effectively collects light along the entire portion of the first light collection line 31 where it superimposes on the individually addressable display elements 2. Likewise, the lenticular element collects light along a second light collection line, indicated in FIG. 4b by reference numeral 32.

As can be seen from FIG. 4b, by virtue of the shape of the individually addressable display element 2, the amount by which second light collection line 32 overlaps the individually addressable display element 2 is approximately the same as the amount by which first light collection line 31 overlaps the individually addressable display element 2. In other words, the amount of light collected by the lenticular element 16 in the case of the second light collection line 32 is approximately the same as the amount of light collected by the lenticular element 16 in the case of the first light collection line 31. Hence, by virtue of the shape of the individually addressable display elements 2, in autostereoscopic mode the display 10 appears of approximately the same brightness in the portion of the display viewed under a second direction corresponding to the second light collection line 32 as in the portion of the display 10 viewed under a first direction corresponding to first light collection line 31. This manifests itself as a reduction or elimination of the previously described variation in brightness in the row direction 4 that occurs with conventionally shaped individually addressable display elements 2.

Indeed, in this embodiment, even a third portion of the display 10 viewed under a third direction corresponding to a third light collection line 33 is of approximately the same brightness as the first and second directions, where the third light collection line 33 crosses two adjacent individually addressable display elements 2, i.e. where the corresponding third direction collects light from the two adjacent individually addressable display elements 2.

The above effect has conveniently been described with reference to FIGS. 4a and 4b by consideration of just one row, which is possible in this embodiment as the above described effect repeats with symmetry on a row by row basis for the particular geometry of this embodiment. However, it is to be appreciated that this single row explanation represents a simplified account of how the light collected by e.g. the whole of light collection line 31 is rendered substantially equal to e.g. the light collected by the whole of light collection line 32 (i.e. each extended over all the rows).

N.B. The row by row symmetry mentioned in the preceding paragraph can be appreciated by referring back to FIG. 3 and noting how the longitudinal axis 7 (corresponding to the light collection lines 31-33 of FIG. 4b) pass over the same part of the individually addressable display elements 2 in the first row and the second row (e.g. to observe this, follow the path of a single longitudinal axis 7 as it passes over a green (G) individually addressable display element 2 in the first row and a blue (B) individually addressable display element 2 in the second row and note how the longitudinal axis 7 passes from the bottom left corner of the cut-out to the bottom right corner of the individually addressable display element in both cases).

Thus, brightness uniformity is increased by "removal" of a portion of a conventional rectangular individually addressable display element 2. This causes an undesirable loss of pixel aperture, but the trade-off with improved brightness uniformity will nevertheless be desirable in many applications.

Figure 5:
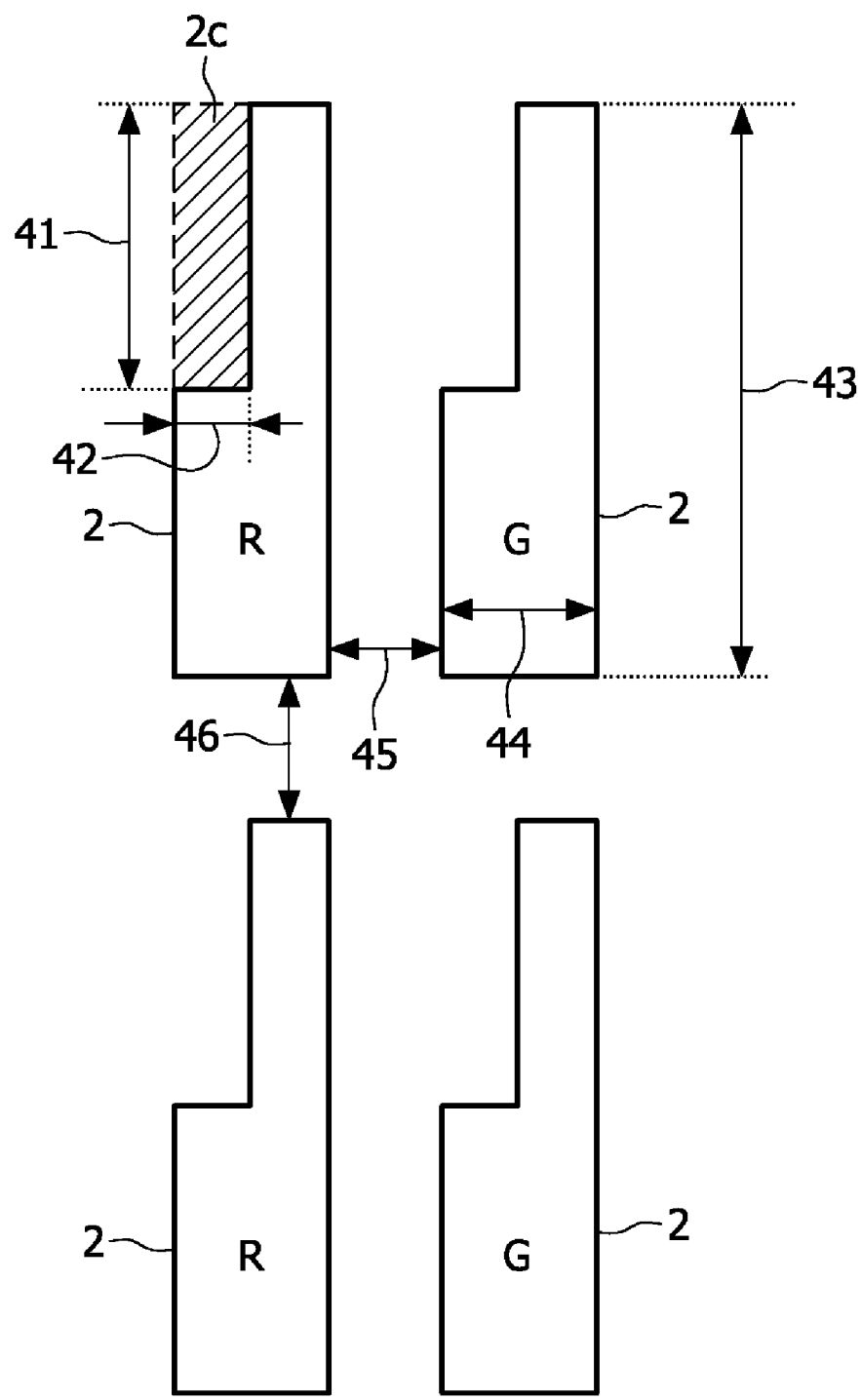
FIG. 5 is a schematic illustration (not to scale) showing two individually addressable display elements of a first row and two individually addressable display elements of a second adjacent row.

Further details of the shape of and spacing between the individually addressable display elements 2 of this embodiment will now be described with reference to FIG. 5, which is a schematic illustration (not to scale) showing two individually addressable display elements 2 of a first row and two individually addressable display elements 2 of a second adjacent row, the individually addressable display elements 2 being shaped, as described above with reference to FIG. 3, to reduce the brightness variation. Generally speaking, suitable dimensions for the size of the cut-out region 2c, i.e. the cut-out height 41 and the cut-out width 42 as shown in FIG. 5, will depend on the slant angle α of the lenticular elements 16 of the lenticular sheet 15, and on the following dimensions indicated in FIG. 5: the main height 43 of the individually addressable display element 2, i.e. the height of the full rectangle footprint from which the cut-out region 2c is removed to provide the individually addressable display element 2; the main width 44 of the individually addressable display element 2, i.e. the width of the full rectangle footprint from which the cut-out region 2c is removed to provide the individually addressable display element 2; the dimensions of the spacings between the individually addressable display elements 2, i.e. the black mask gaps between the individually addressable display elements 2, more particularly the horizontal mask gap 45 and the vertical mask gap 46.

In this embodiment the cut-out dimensions are provided by formulae, as follows. The cut-out height 41 is equal to the horizontal mask gap 45 divided by tan α. The cut-out width 42 is equal to the vertical mask gap 46 multiplied by tan α. In this embodiment the display is a 5 view autostereoscopic display and the slant angle is α=arctan (⅓), i.e. tan α=⅓. Furthermore, the horizontal mask gap 45 is 12 μm, and the vertical mask gap 46 is 24.3 μm. Hence in this embodiment the cut-out height 41 is 36 μm and the cut-out width 42 is 8.1 μm.

Although in this approach suitable cut-out dimensions are derived based primarily on the black mask gaps 45 and 46, nevertheless a design restraint is that the main dimensions 43 and 44 of the individually addressable display elements 2 must be sufficiently large to accommodate the cut-out dimensions 41 and 42. In this embodiment, the main height 43 of the individually addressable display elements 2 is 89.7 μm and the main width 44 of the individually addressable display elements 2 is 26 μm.

In further embodiments, the notion that aperture can be sacrificed to achieve better 3D performance is taken a step further by consideration of ways to select the dimensions of the horizontal mask gap 45 and/or the vertical mask gap 46 to improve or optimise required performance. This usually involves an increase or a further increase of the size of the horizontal mask gap 45 and/or the vertical mask gap 46 compared to conventional arrangements, with a consequent further decrease in aperture. On the other hand, in some situations, the cut-out-itself can allow for a decrease in the size of the horizontal mask gap 45. Leaving this latter point aside for the moment, one embodiment of such an optimisation approach of the autostereoscopic performance, albeit with quite a strong trade-off penalty with aperture) will now be described with reference to FIGS. 6a and 6b.

Figure 6A:
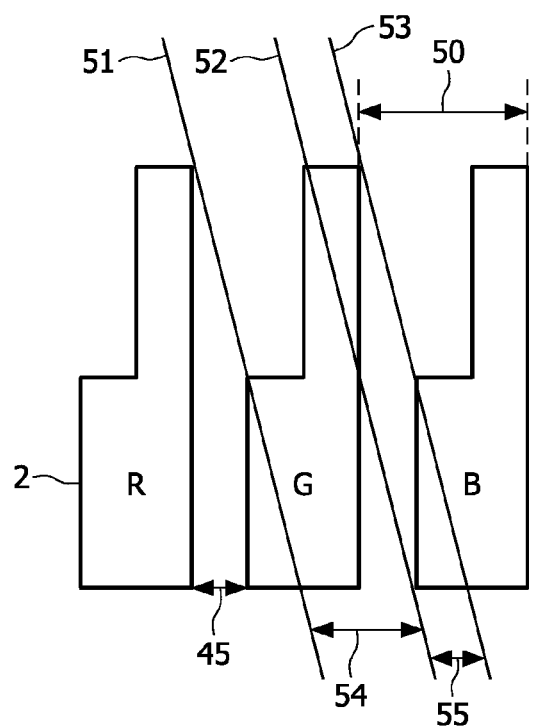
FIG. 6a is a schematic illustration (not to scale) showing three individually addressable display elements shaped to reduce brightness variation.

FIG. 6a is a schematic illustration (not to scale) showing three individually addressable display elements 2 shaped, as described above with reference to FIG. 3, to reduce the brightness variation. FIG. 6a indicates the pitch 50 between the individually addressable display elements 2, and also the above described horizontal mask gap 45. Also shown in FIG. 6a are three viewing light collection lines 51, 52, 53 of the same type as light collection lines 31, 32 and 33 described above with reference to FIG. 4b. More particularly, in FIG. 6a the light collection lines 51, 52, 53 indicate a division of the view seen by a viewer of the autostereoscopic display 10 into a "pure view" region 54 and a "mixed view" region 55. In the pure view region 54, the light is sampled from one individually addressable display element 2 on each row only. In the mixed view region 55, the light is sampled from two adjacent individually addressable display elements 2 on each row.

Thus, by virtue of the cut-out shape, the light collection lines all cover a substantially equal amount of pixel area, but in view directions corresponding to the 'mixed view' region the viewer sees a mixture of two views. If the stereoscopic difference (the disparity) between these views is relatively mild this cross talk may advantageously facilitate a blending and transition from one view to another as the viewer's eye moves with respect to the display 8. However if the disparity is large this 'cross talk' may become a disadvantageous noticeable artefact that limits the autostereoscopic performance. In this embodiment the pixel aperture is optimised to eliminate the 'mixed view' region altogether. By performing calculations that demand that the 'mixed view' region be zero, while at the same time demanding that the aperture itself must be as large as possible, we obtain two equations in two unknowns, namely the horizontal mask gap 45 and the vertical mask gap 46, that can be solved to provide design dimensions, as follows.

Let the horizontal mask gap 45 be h. Let the vertical mask gap 46 be v. Let the pitch 50 be p. Also, here again the slant angle α is such that tan α=⅓.

The width of the mixed view region $55 = p - (⅓)v - h$

The width of the pure view region $54 = (⅓)v + h$

We are attempting to obtain the width of the mixed view region 54=0, i.e. $(⅓)v + h = p$ At the same time we are attempting to make the aperture as large as possible:

Aperture$=[(p-h)(3p-v)-(3h(⅓)v)]/3p^2$ i.e. Aperture$=(p-h)h/p$ which leads to:

$h = p/2$, (and note also $v=(3/2)p$)

which leads to:

Aperture=25%

Thus the solution to the equations results in the horizontal mask gap 45 being half the pitch of the individually addressable display elements 2 and the vertical mask gap 46 is half the vertical pitch of the individually addressable display elements 2. The total aperture is then 25%. This is a relatively low aperture value, but is a trade-off that may be a price worth paying in autostereoscopic display applications demanding improved 3D performance, since the mixed view zone has been minimised.

Figure 6B:
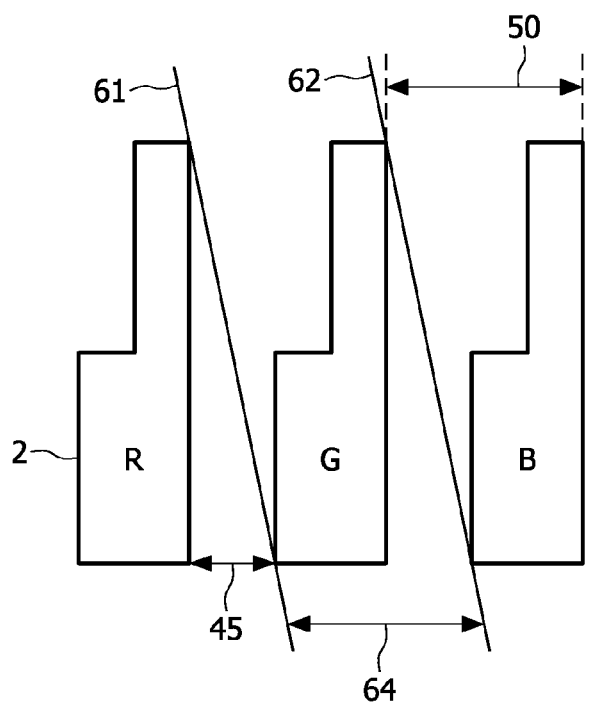
FIG. 6b is a schematic illustration (not to scale) showing three individually addressable display elements of an embodiment arranged according to the dimensions reached via equations.

FIG. 6b is a schematic illustration (not to scale) showing three individually addressable display elements 2 of an embodiment arranged according to the dimensions reached via the above equations. Light collection lines 61, 62 are of the same type as light collection lines 31, 32 and 33 described above with reference to FIG. 4b, i.e. these light collection lines correspond to different view directions. More particularly, in FIG. 6b the light collection lines 61 and 62 show how in this embodiment the view seen by a viewer of the autostereoscopic display 10 comprises only pure view regions such as pure view region 64, but no mixed view regions.

Figure 7:
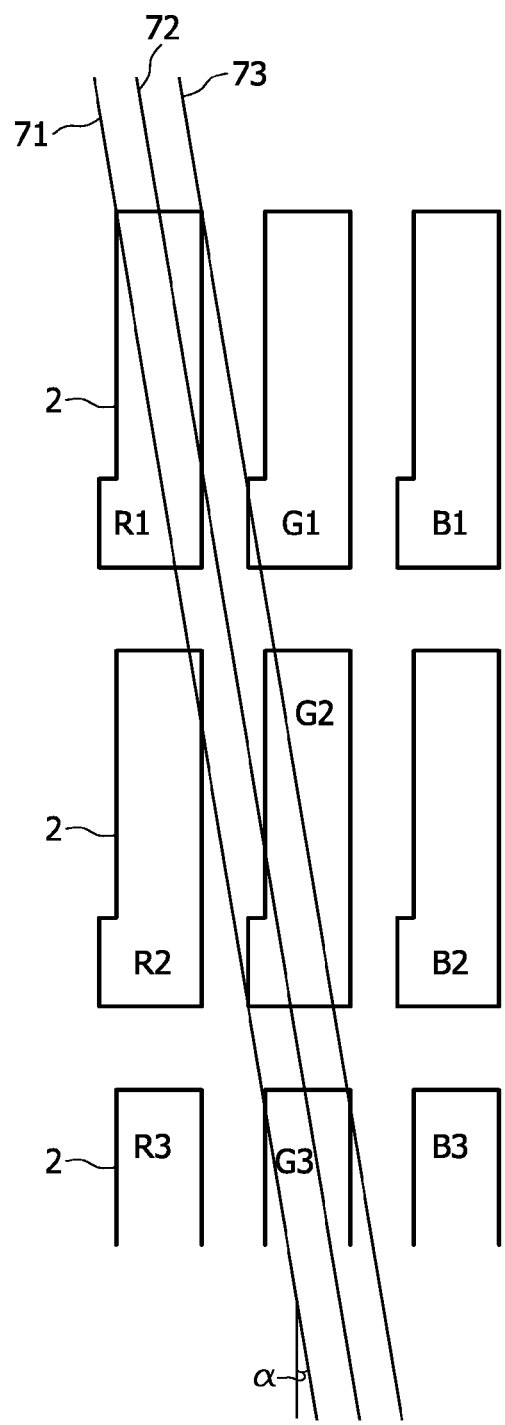
FIG. 7 is a schematic illustration (not to scale) showing individually addressable display elements of a further embodiment.

FIG. 7 is a schematic illustration (not to scale) showing a further embodiment in which the individually addressable display elements 2 are again shaped, as described above with reference to FIG. 3, to reduce the brightness variation. In this embodiment, the slant angle α is such that tan α=⅙. FIG. 7 shows, by way of example, three rows by three columns of individually addressable display elements (in the case of the bottom row only the top part of each individually addressable display element is shown). The colours of the individually addressable display elements are again indicated by "R" (red), "G" (green, and "B" (blue), more particularly in the first row R1, G1, B1; in the second row R2, G2, B2; and in the third row R3, G3, B3. Let us again consider a plurality of light collection lines by way of example, indicated in FIG. 7 by reference numerals 71-73, parallel with the main longitudinal axis 7 of the lenticular elements 16.

In this embodiment, there is a two-row by two-row symmetry, i.e. we need to consider the overlap of a light collection line and the individually addressable display elements over the course of two consecutive rows. As can be seen from FIG. 7, each of (i) the amount by which the first light collection line 71 overlaps the individually addressable display elements R1 and R2 (when the respective overlaps are summed), (ii) the amount by which the second light collection line 72 overlaps the individually addressable display elements R1 and G2 (when the respective overlaps are summed), and (iii) the amount by which the third light collection line 73 overlaps the individually addressable display elements G1 and G2 is approximately equal.

Again, this manifests itself as a reduction or elimination of the previously described variation in brightness in the row direction 4 that occurs with conventionally shaped individually addressable display elements 2.

The present embodiment has conveniently been described with reference to FIG. 7 by consideration of just two rows, which is possible in this embodiment as the above described effect repeats with symmetry on a two-row by two-row basis for the particular geometry of this embodiment. However, it is to be appreciated that this two row explanation represents a simplified account of how the respective amounts of light collected by the whole of each of light collection lines 71, 72 and 73 when extended over all the rows are rendered substantially equal.

In the above embodiments the shape of the individually addressable display elements 2 is provided by virtue of a cut-out region 2c removed from the top left hand corner of the footprint of a rectangular shaped individually addressable display element 2, as viewed with respect to the orientation of the Figures. This has a fabrication advantage in that this is a convenient location where active matrix components such as thin film transistors, storage capacitors, contact holes and so on can be located. Nevertheless, in other embodiments, other shapes of individually addressable display elements 2 may be provided in which the shapes comprise the shape remaining from the footprint of a rectangle when one or more cut-out regions are "removed" from other parts of the rectangular footprint. Examples of such embodiments will now be described with reference to FIGS. 8-11.

Figure 8:
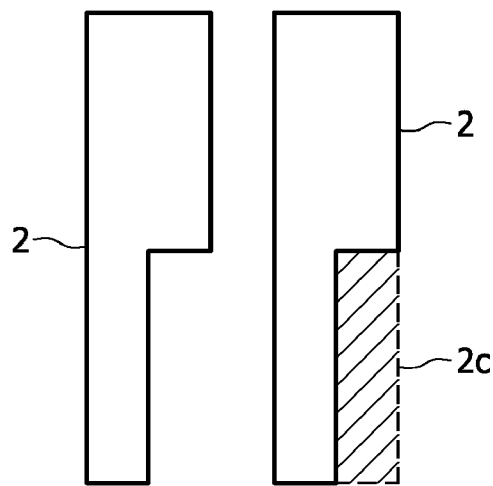
FIG. 8 is a schematic illustration (not to scale) showing two of a further embodiment.

FIG. 8 is a schematic illustration (not to scale) showing two individually addressable display elements 2 of a further embodiment. In this embodiment a rectangular cut-out region 2c is positioned at the bottom right-hand corner of the individually addressable display element 2, as viewed in the same orientation as the previous Figures, e.g. in terms of slant angle α etc. This embodiment operates in the same manner as the above described embodiments.

Figure 9:
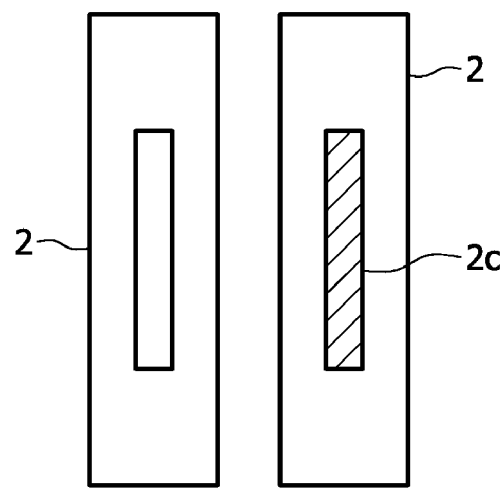
FIG. 9 is a schematic illustration (not to scale) showing two individually addressable display elements of a further embodiment.

In fact, a rectangular cut-out region can in principle be positioned anywhere in correspondence with the sense or direction of the earlier described light collection lines such as light collection lines 31, 32, 33 shown in FIG. 4b, i.e. in the case of the orientations of the previous Figures, anywhere along the diagonal from top left to bottom right of the footprint of a conventional rectangular individually addressable display element 2, an example of which will now be described with reference to FIG. 9.

FIG. 9 is a schematic illustration (not to scale) showing two individually addressable display elements 2 of a further embodiment. In this embodiment a rectangular cut-out region 2c is positioned approximately at the centre of the individually addressable display element 2, as viewed in the same orientation as the previous Figures. This embodiment is advantageous in that a symmetrical shape of individually addressable display element 2 is employed. This advantageous aspect will be discussed in further detail later below.

Examples in which the shape of the individually addressable display elements 2 comprises the shape remaining from the footprint of a conventional rectangular individually addressable display element when two separate cut-out regions are "removed" will now be described with reference to FIGS. 10 and 11.

FIG. 10a is a schematic illustration (not to scale) showing two individually addressable display elements 2 of a further embodiment. In this embodiment a first rectangular cut-out region 2d is positioned at the top left-hand corner of the individually addressable display element 2 and a second rectangular cut-out region 2e is positioned at the bottom right-hand corner of the individually addressable display element 2, as viewed in the same orientation as the previous Figures, e.g. in terms of slant angle α etc. FIG. 10b indicates schematically how in operation the combined effect of the first rectangular cut-out region 2d and the second rectangular cut-out region 2e is approximately equivalent to that of a single cut-out region 2c as employed in the previously described embodiments.

FIG. 11a is a schematic illustration (not to scale) showing two individually addressable display elements 2 of a further embodiment. In this embodiment a first triangular cut-out region 2f is positioned at the top left-hand corner of the individually addressable display element 2 and a second triangular cut-out region 2g is positioned at the bottom right-hand corner of the individually addressable display element 2, as viewed in the same orientation as the previous Figures, e.g. in terms of slant angle α etc. FIG. 11b indicates schematically how in operation the combined effect of the first triangular cut-out region 2f and the second triangular cut-out region 2g is approximately equivalent to that of a single cut-out region 2c as employed in the previously described embodiments.

In a further embodiment, the following display details are implemented. The individually addressable display elements are shaped as in FIG. 11a. The display device is a 4.57 cm (i.e. 1.8") quarter video graphic array (QVGA) 564 dots per cm (222 dots per inch) transmissive aperture active matrix liquid crystal display, fitted with a 4 view switchable 2D/3D lens system at a slant angle α=arctan(⅓). In 3D mode the lenticular lenses have a focal length of 1.5 mm in glass, coinciding exactly with the liquid crystal display image plane. The view point is designed at 400 mm in front of the display, although the 3D effect can be experienced from much closer by due to the multiview nature of the display. The resolution in 3D mode is 120×160 triplets per view. The 2D resolution is 240×320. The display provides substantially full brightness in both 2D and 3D modes.

Performance of certain of the various embodiments described above has been simulated. Each simulation result shows a more uniform brightness along the row direction compared to comparison simulations of conventional rectangular shaped individually addressable display elements.

The simulation results show a further particular improvement provided by the individually addressable display element shape shown in FIG. 9, i.e. where the cut-out region 2c is located at or approximately at the centre of the individually addressable display element 2, as will now be explained. In the simulation images provided by the other embodiments there is a residual pixel structure that appears in bands. This pixel structure causes no brightness variations and is not visible from a suitable distance, but could be noticeable if the display is viewed from close by. The reason for this pixel structure artefact may be explained by referring again to FIG. 6a. As mentioned, in the "mixed view" region the lenticular element collects light from adjacent pixels, in between it collects (no) light from the black mask. This means that the lenticular element fills up with two lit areas separated by a horizontal black band. This black band appears in addition to the black band of vertical pixel separation. In the "pure view" region the lenticular elements simply fill up with a single lit area and a single horizontal black area. The individually addressable display element shape shown in FIG. 9 reduces this artefact by causing similarly split lit areas in the "pure view" region.

The various dimensions of the individually addressable display elements, mask gap sizes, cut-out region sizes, slant angle, number of views, and so on in the above embodiments are merely by way of example, and in other embodiment one or more of these values may be different to those described above.

In some of the above embodiments there is one cut-out region in each individually addressable display element. In other embodiments there are two cut-out regions in each individually addressable display element (e.g. FIGS. 10a and 11a). In further embodiments, there may be more than two cut-out regions in each individually addressable display element.

In the above embodiments the slant angle is such that, in the schematic illustrations, the lenticular elements and resulting light collection lines slant from left to right down the page with the Figures orientated as shown. However, this need not be the case, and in other embodiments the lenticular elements and resulting light collection lines slant from right to left down the page with the Figures orientated as shown. In this case, the individually addressable display elements will be shaped such that the cut-out or cut-outs also lie on the approximately diagonal direction from the top right to the bottom left of the footprint of a rectangular individually addressable display element.

In the above embodiments, a slant angle between the longitudinal axis of the lenticular elements 16 and the column direction 6 is provided by virtue of the lenticular elements 16 being slanted compared to an overall rectangular shape of the lenticular sheet 15; the row direction 4 and the column direction 6 of the array of individually addressable display elements 2 being perpendicular to each other (i.e. conventional row and column directions). However, in other embodiments, the slant angle between the lenticular elements and the column direction of the array of individually addressable display elements may instead be provided by virtue of the array having a column direction that is slanted to the row direction, with the lenticular sheet comprising non-slanted lenticular elements. Indeed, it is even possible for an overall slant angle to be provided by a combination of slanted lenticular elements and slanted column direction.

In the above description, for convenience and clarity the shape of the individually addressable display elements is often described in terms of the shape remaining from a rectangular footprint when one or more cut-outs are "removed". This terminology is used to allow useful comparison of examples of different shapes of individually addressable display elements encompassed by the invention and their functions. It will be appreciated that the use of this terminology does not imply or mean that such individually addressable display elements are fabricated by actually producing first a rectangular individually addressable display element and then literally removing the cut-out area or areas. On the contrary, the non-rectangular shaped individually addressable display elements may be produced in any convenient or suitable manner, for example directly using masks with the final non-rectangular shape.

In the above described embodiments the individually addressable display elements are shaped differently to a conventional rectangular shape to an extent that the light collected from all different light collection lines is equal, approximately equal or substantially equal. However, in other embodiments, such shapes may be used but to a lesser degree, e.g. smaller cut-out sizes, such that the light collected from different light collection lines is more equal than the case for rectangular individually addressable display elements, but only to an extent that brightness variation is reduced but not as much as in the above described embodiments.

However, it is generally advantageous to provide embodiments where the extent by which each respective light collection line overlaps the individually addressable display elements varies between any two light collection lines by less than 25%. It is even more advantageous to provide embodiments where the extent by which each respective light collection line overlaps the individually addressable display elements varies between any two light collection lines by less than 10%. And it is yet even more advantageous to provide embodiments where the extent by which each respective light collection line overlaps the individually addressable display elements varies between any two light collection lines by less than 5%.

In the above described embodiments there is either a row by row symmetry of how the light collection lines pass over the individually addressable display elements (e.g. FIG. 4b embodiment) or a 2-rows by 2-rows symmetry of how the light collection lines pass over the individually addressable display elements (e.g. FIG. 7 embodiment). However, other symmetries are possible, e.g. for tan $\alpha = \frac{1}{9}$ there would be a three-row symmetry. Also, in other embodiments, the extent of light collection lines passing over the individually addressable display elements may be rendered more equal when all the rows are considered even though there may be no symmetry of this sort between rows.

The light collection lines referred to in the above description may in practice have finite width, and this width might be, say, 10 µm if the lenticular elements are defocused due to manufacturing tolerances, temperature effects and so on. The analytical and descriptive approach in the description above nevertheless remains valid, for example understanding the term "line" to mean e.g. "narrow ribbon" or "narrow band". Another way of looking at this is that a broad line can be thought of as a light collection of many narrow lines. The functionality of the present invention means that the overlap on each narrow line is substantially constant with viewing direction and hence the overall overlap with a corresponding or aggregate broad line is also substantially constant with viewing direction. Indeed, the present invention functions even if, in an extreme case, the lenticular elements were such that each viewing direction corresponded to two or more lines underneath each (bifocal) lens. The overlap on each line is constant and therefore on each collection of lines.

In the above described embodiments the colours of the individually addressable display elements are red, green and blue. This need not be the case, and in other embodiments, other colours may be used, for example cyan, magenta and yellow.

Furthermore, in other embodiments, there may be more than three colours, for example in other embodiments the individually addressable display elements may be of four colours, e.g. red, green, blue and "white".

In yet further embodiments, the display may be a monochrome display and each individually addressable display element is of the same colour, e.g. white.

In the above described embodiments, a lenticular sheet (lens) comprising longitudinal lenticular elements is used to direct light to different locations to provide autostereoscopic operation. However, in other embodiments, any other appropriate light directing means for carrying out such light directing may be employed instead.

In the above described embodiments, the pitch of the lenticular elements of the lenticular sheet is chosen in relation to the pitch of the individually addressable display elements in the row direction to provide multi-view (i.e. more than two views) autostereoscopic operation. In particular an example of a 5-view display is described above. However, this need not be the case, and in other embodiments the autostereoscopic display only provides a "2-view image", i.e. a single 3-D image. Also, considering again multi-view embodiments, numbers of views other than 4 or 6 may be provided, e.g. 7-view, 9-view, and even fractional numbers of views, e.g. 4.5.

In the above embodiments, the various forms of the colour filter are employed in switchable (between autostereoscopic operation and 2-D operation) colour display apparatus. However, it will be appreciated that advantages are nevertheless derived when the above described colour filter layouts are used for autostereoscopic mode alone, i.e. even if not actually used in 2-D operation, and hence the present invention is also embodied in autostereoscopic colour display apparatus comprising such colour filters, even when such autostereoscopic colour display apparatus is not switchable to a 2-D mode, i.e. such apparatus do not comprise a switchable diffuser.

In the above embodiments, when the display device is provided in switchable form between 2-D mode and stereoscopic mode, such switching capability is provided by a switchable diffuser. However, this need not be the case, and in other embodiments, other switchable means are provided, for example active lenses, e.g. liquid crystal lenses, as described for example in U.S. Pat. No. 6,069,650, the contents of which are contained herein by reference.

Moreover, the present invention is also embodied in colour (and monochrome) filters per se with colour filter element shapes such as those described in the embodiments above. In this case, where the terminology "individually addressable display element" is used above to refer to an effective coloured display element resulting from the presence of the relevant area of the colour filter itself, in the case of a discrete colour filter the individual colour elements 2 may be conveniently termed "individual colour filter elements 2", and the details described in the above embodiments with respect to the shapes of the individually addressable display elements applies in corresponding fashion above to the shapes of the individual colour filter elements of embodiments of such a colour filter.

It will be appreciated that various known refinements to autostereoscopic display apparatus may readily be applied to embodiments of the present invention. For example, to further reduce brightness variations, the lenticular lens may be arranged to operate in a defocused manner.

In the above described embodiments, the invention is embodied in an active colour matrix liquid crystal display. However, in other embodiments the invention may be embodied in other forms of colour array display devices, for example organic light emitting diode (OLED) display devices or "electronic-ink" display devices.

In the above described embodiments the invention is embodied in a direct-view display apparatus. However, in other embodiments the invention may be embodied in a projection display apparatus, such as that described in EP-A-0 791 847, whose contents are incorporated herein by reference.

It will be apparent from the embodiments described above that a common feature of the different embodiments is that the shape of the individually addressable display elements is determined in combination with the effect of the slant angle between the lenticular element and the column direction to provide for a more equal collection of light from different light collection lines crossing the individually addressable display elements. Broadly speaking, this is achieved by provision of one or more cut-out regions compared to a rectangular shape. More particularly, the cut-out regions effectively avoid or reduce light collection from a part of a conventional rectangular individually addressable display element that would otherwise represent an increased light collection amount compared to another part of the individually addressable display element, due to the angular direction in which the light collection lines pass over the geometrical shape or area of the individually addressable display element. The embodiments described above represent certain examples of shape for achieving this, but it will be appreciated that other exact shapes may be derived by the skilled person on a routine basis once this approach is understood. In particular, it is noted that with the understanding provided by the embodiments above and analysis thereof, the suitability of other envisaged shapes may easily and routinely be assessed by the skilled person in any of a number of ways, for example by using simulations, trial and error, and so on. That is, following from the present description, it is readily within the ambit of the skilled person to try out different shapes of individually addressable display element, and to then model or otherwise assess the resulting autostereoscopic performance (e.g. in terms of brightness uniformity) to assess the usefulness of any particular shape he or she has considered, and to implement any shapes showing suitable results. This is further apparent from consideration of the shapes of the individually addressable display element shapes of the various autostereoscopic devices disclosed in the prior art documents mentioned in the introductory part of the description above (i.e. U.S. Pat. No. 5,833,507; WO 2005/006777 A; EP-A-0 833 184; WO 97/02709 A; and US 2005/0036221 A). Firstly, no specification of slanted angle is provided. Secondly, even if hypothetical slanted light collection lines are considered, it is apparent that the pixel shapes do not provide the effect of the present invention of making the light collected by each such respective slanted light collection line more equal, and indeed most or all of the prior-art non-rectangular shapes therein disclosed in fact render this aspect worse.

The invention claimed is:

1. An autostereoscopic display apparatus, comprising:
a plurality of individually addressable display elements arranged in an array of rows and columns;
light directing means comprising a plurality of light directing elements, wherein the light directing elements and the column direction of the array of individually addressable display elements have a slant angle therebetween;
a plurality of light collection lines parallel to the longitudinal axis of the light directing elements extending over the array, wherein the shape of the individually addressable display elements substantially comprises the shape remaining from a rectangular footprint when one or more cut-outs is removed, and wherein the one or more cut-outs are positioned relative to the slant angle of the light directing elements such that the extent by which each respective light collection line overlaps the individually addressable display elements is more equal than would be the case were the individually addressable display elements shaped according to the rectangular footprint.

2. An autostereoscopic display apparatus according to claim 1, wherein the extent by which each respective light collection line overlaps the individually addressable display elements varies between any two light collection lines by less than 25%.

3. An autostereoscopic display apparatus according to claim 1, wherein the extent by which each respective light collection line overlaps the individually addressable display elements varies between any two light collection lines by less than 10%.

4. An autostereoscopic display apparatus according to claim 1, wherein the extent by which each respective light collection line overlaps the individually addressable display elements varies between any two light collection lines by less than 5%.

5. An autostereoscopic display apparatus according to claim 1, wherein the shape of the individually addressable display elements substantially comprises the shape remaining from a rectangular footprint when a single substantially rectangular cut-out is removed from a corner of the rectangular footprint.

6. An autostereoscopic display apparatus according to claim 1, wherein the shape of the individually addressable display elements substantially comprises the shape remaining from a rectangular footprint when a single substantially rectangular cut-out is removed from the centre of the rectangular footprint.

7. An autostereoscopic display apparatus according to claim 1, wherein the shape of the individually addressable display elements substantially comprises the shape remaining from a rectangular footprint when a first cut-out is removed from a first corner of the rectangular footprint and a second cut-out is removed from a second corner of the rectangular footprint, the second corner being diagonally opposite the first corner.

8. An autostereoscopic display apparatus according to claim 7, wherein the first cut-out and the second cut-out together form an effective rectangular cut-out.

9. An autostereoscopic display apparatus according to claim 1, wherein the shape of the individually addressable display elements and the spacing between the individually addressable display elements is arranged to meet a criterion that each light collection line overlaps only one individually addressable display element on each row.

10. An autostereoscopic display apparatus, comprising:
a plurality of individually addressable display elements arranged in an array of rows and columns;
light directing means comprising a plurality of light directing elements, wherein the light directing elements and the column direction of the array of individually addressable display elements have a slant angle therebetween;
a plurality of light collection lines parallel to the longitudinal axis of the light directing elements extending over the array, wherein the shape of the individually addressable display elements substantially comprises the shape remaining from a rectangular footprint when one or more cut-outs is removed, and wherein the one or more cut-outs are positioned relative to the slant angle of the light directing elements such that the extent by which each respective light collection line overlaps the individually addressable display elements is substantially equal for all the light collection lines.

11. An autostereoscopic display apparatus, comprising:
a plurality of individually addressable display elements arranged in an array of rows and columns; light directing means comprising a plurality of light directing elements, wherein the light directing elements and the column direction of the array of individually addressable display elements have a slant angle therebetween, wherein the shape of the individually addressable display elements substantially comprises the shape remaining from a rectangular footprint when one or more cut-outs is removed, the one or more cut-outs being positioned relative to the slant angle of the light directing elements such as to provide a reduction in brightness variation along the row direction compared to what individually addressable display elements shaped according to the rectangular footprint would provide.

12. An autostereoscopic display apparatus, comprising:
a plurality of individually addressable display elements arranged in an array of rows and columns;
light directing means comprising a plurality of light directing elements, the light directing elements and the column direction of the array of individually addressable display elements having a slant angle therebetween, wherein the shape of the individually addressable display elements substantially comprises the shape remaining from a rectangular footprint when one or more cut-outs is removed, the one or more cut-outs being of a height substantially equal to the mask gap size in the row direction divided by the tangent of the slant angle and of a width substantially equal to the mask gap size in the column direction multiplied by the tangent of the slant angle.

13. A filter for use in a display, the filter comprising a plurality of individual filter elements arranged in an array of rows and columns; wherein the shape of the individual filter elements comprises the shape remaining from a rectangular footprint when one or more cut-outs is removed; the one or more cut-outs being positioned along a diagonal direction across the rectangular footprint.

14. A filter according to claim 13, wherein the shape of the individual filter elements substantially comprises the shape remaining from a rectangular footprint when a single substantially rectangular cut-out is removed from a corner of the rectangular footprint.

15. A filter according to claim 13, wherein the shape of the individual filter elements substantially comprises the shape remaining from a rectangular footprint when a single substantially rectangular cut-out is removed from the centre of the rectangular footprint.

16. A filter according to claim 13, wherein the shape of the individual filter elements substantially comprises the shape remaining from a rectangular footprint when a first cut-out is removed from a first corner of the rectangular footprint and a second cut-out is removed from a second corner of the rectangular footprint, the second corner being diagonally opposite the first corner.

17. A filter according to claim 16, wherein the first cut-out and the second cut-out together form an effective rectangular cut-out.

\* \* \* \* \*